United States Patent
Caldwell et al.

(10) Patent No.: US 9,596,728 B2
(45) Date of Patent: Mar. 14, 2017

(54) MAINTAINING OUTPUT CAPACITANCE VOLTAGE IN LED DRIVER SYSTEMS DURING PWM OFF TIMES

(71) Applicant: LINEAR TECHNOLOGY CORPORATION, Milpitas, CA (US)

(72) Inventors: Joshua William Caldwell, Los Gatos, CA (US); Dongwon Kwon, San Jose, CA (US); Lucas Andrew Milner, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 15/147,842

(22) Filed: May 5, 2016

(65) Prior Publication Data

US 2016/0353532 A1 Dec. 1, 2016

Related U.S. Application Data

(60) Provisional application No. 62/168,234, filed on May 29, 2015.

(51) Int. Cl.
  *H05B 33/08* (2006.01)
  *H02M 3/156* (2006.01)
  *H02M 3/337* (2006.01)

(52) U.S. Cl.
  CPC ........ *H05B 33/0815* (2013.01); *H02M 3/156* (2013.01); *H02M 3/3376* (2013.01); *H05B 33/0812* (2013.01); *H05B 33/0845* (2013.01); *H05B 33/0857* (2013.01)

(58) Field of Classification Search
  CPC ............ H05B 33/0815; H05B 33/0851; H05B 33/0887; H05B 33/0824; H05B 33/0827; H05B 33/0845; H05B 33/0848; H05B 33/0812; H05B 33/0857; H02M 3/156; H02M 2001/0003; H02M 2001/0025; H02M 3/3376; Y02B 20/346
  See application file for complete search history.

(56) References Cited

U.S. PATENT DOCUMENTS

| 6,799,070 B2 * | 9/2004 | Wolfe | A61N 1/025 607/7 |
| 7,612,543 B2 * | 11/2009 | Yu | H02M 3/156 323/222 |
| 8,232,743 B2 * | 7/2012 | Chen | H05B 33/0815 315/232 |

(Continued)

FOREIGN PATENT DOCUMENTS

EP    2259161 A2 * 12/2010    ............... G05F 1/56

*Primary Examiner* — Vibol Tan
(74) *Attorney, Agent, or Firm* — Han Santos, PLLC

(57) ABSTRACT

A method and system of driving an LED load. A driver is configured to deliver a level of current indicated by a control signal to the LED load when a PWM signal is ON and stop delivering the level of current when the PWM signal is OFF. An output capacitance element is coupled across a differential output of the LED driver. A feedback path, having a store circuit, is configured to store an information indicative of a first voltage level across the output capacitance element as a stored feedback reference signal just after the PWM signal is turned OFF. The feedback path causes the voltage across the output capacitance element to be at the first voltage level just before the PWM signal is turned ON.

20 Claims, 5 Drawing Sheets

(56) References Cited

U.S. PATENT DOCUMENTS

| | | | | |
|---|---|---|---|---|
| 8,294,443 | B2* | 10/2012 | Chang | .................. H02M 3/156 |
| | | | | 323/282 |
| 8,885,363 | B2* | 11/2014 | Lin | .................. H02M 3/33523 |
| | | | | 363/21.12 |
| 8,988,053 | B2* | 3/2015 | Hsu | .................... H02M 3/1584 |
| | | | | 323/272 |
| 9,450,488 | B2* | 9/2016 | Chang | .................. H02M 3/156 |

\* cited by examiner

MAINTAINING OUTPUT CAPACITANCE VOLTAGE IN LED DRIVER SYSTEMS DURING PWM OFF TIMES

CROSS-REFERENCE TO RELATED APPLICATION

The present application claims the benefit of priority under 35 U.S.C. §119 from U.S. Provisional Patent Application Ser. No. 62/168,234 entitled "Maintaining Output Capacitance Voltage in LED Driver During PWM OFF Times," and from U.S. Provisional Patent Application Ser. No. 62/168,156 entitled "Maintaining LED Driver Operating Point During PWM OFF Times," filed on May 29, 2015, which are hereby incorporated by reference in their entirety for all purposes.

BACKGROUND

Technical Field

This disclosure generally relates to methods and systems of driving light emitting diodes ("LEDs"). More particularly, the present disclosure relates to LED driver circuits that maintain an output voltage across an output capacitance element for an LED driver.

Description of Related Art

An LED is a P-N junction diode that emits light when a suitable voltage is applied to its leads. To that end, various circuits are used to power an LED. Such circuits not only provide sufficient current to light the LED at the desired brightness and color temperature, but also limit the current to prevent damaging the LED. FIG. 1A illustrates an example of a prior art LED driver system 100 that regulates output current 101 to LEDs 115 at a level indicated by a control signal at a control signal input 103 when a pulse width modulation ("PWM") signal at the PWM node 105 is ON (i.e., HI). When the PWM signal is OFF (i.e., LO), the output current 101 is zero and the LED load 115 does not emit light. Accordingly, the average value of the output current 101 is controlled by the relative ON and OFF durations of the PWM signal. Put differently, the intensity of the light emitted by the LEDs 115 can be increased with a higher duty cycle and dimmed by lowering the duty cycle of the PWM signal at node 105.

As illustrated in FIG. 1A, an LED driver system 100 may include an LED driver 119, a voltage divider network that may include resistors 123 and 125 in series, an output capacitance element 117, a current sensor 121, and an electronic switch 111.

When the PWM signal 105 is OFF, the LED load 115 may be disconnected by the electronic switch 111 and the voltage that was across the output capacitance element 117 before the PWM signal 105 was turned OFF may be maintained by the output capacitance element 117.

The features of the LED driver system 100 may be better understood in view of FIG. 1B, which illustrates example waveforms of the LED driver system 100. When the PWM is ON, the LED load 115 is ON (e.g., emits light) and the voltage level at the output $V_{OUT}$ is determined by the sum of forward voltages of the LEDs 115 at the current level set by the control signal input 103 and regulated by the $i_{LED}$ feedback path via the current sensor 121. Consequently, the voltage level at the feedback node FB is determined by the resistors 123 and 125 for the given $V_{OUT}$ voltage. When the PWM is turned OFF, the LED load 115 is OFF (e.g., stops emitting light) and the voltages at the output $V_{OUT}$ as well as the feedback node FB are subject to leakage. When the PWM is turned back ON, the LED load 115 emits light, which may not be at the desired color temperature and/or intensity until the voltages at the output $V_{OUT}$ and feedback node FB are ramped back up to the appropriate level by the LED driver 119.

Ideally, the capacitance element 117 should hold the output voltage $V_{OUT}$ constant during the PWM OFF time. However, under real world conditions, the output capacitance element 117 decays (e.g., loses charge) during OFF periods of the PWM signal due to internal leakage and/or leakage of any circuits connected to the output capacitance element 117, such as the first electronic switch 111, feedback resistance elements (e.g., resistors) R1 (123) and R2 (125). The voltage drop becomes more significant as the PWM OFF duration increases. After a long PWM OFF time (e.g., more than 1 second), the output voltage $V_{OUT}$ across the output capacitance element 117 may be lower than its value of the PWM ON period.

Accordingly, when the PWM signal 105 is turned back ON after a long OFF period, the LED driver 119 may be subject to a recovery time until the output capacitance element 117 has returned to its original output voltage. Such a delay can be problematic in applications that desire the color temperature and/or the intensity of the LED load 115 to be at a predetermined level immediately after the LED load 115 is turned ON. Traditional approaches of having longer PWM ON time to include the recovery delay in addition to the desired LED load ON time, not only increases power consumption but may not be effective because the recovery delay may vary with the size of the output capacitance element 117, process, temperature, desired LED light intensity, and the PWM OFF durations.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings. Some embodiments may be practiced with additional components or steps and/or without all of the components or steps that are described.

The various methods and circuits disclosed herein generally relate to methods and circuits of maintaining an output voltage reference level for an LED driver such that recovery time is substantially reduced or eliminated. The LED driver is configured to deliver a level of current indicated by a control signal to an LED load when the PWM signal is ON and stop delivering the level of current when the PWM signal is OFF. An output capacitance element that is coupled across a differential output of the driver smooths out the voltage across the LED load. A first feedback path has a store circuit that is configured to store an information indicative of a voltage level across the output capacitance element when (e.g., just after) the PWM signal is turned OFF. The first feedback path causes the voltage across the output capacitance element to be at that voltage level during the PWM OFF period, such that recovery time for the LED load is substantially reduced or eliminated.

Figure 1A:
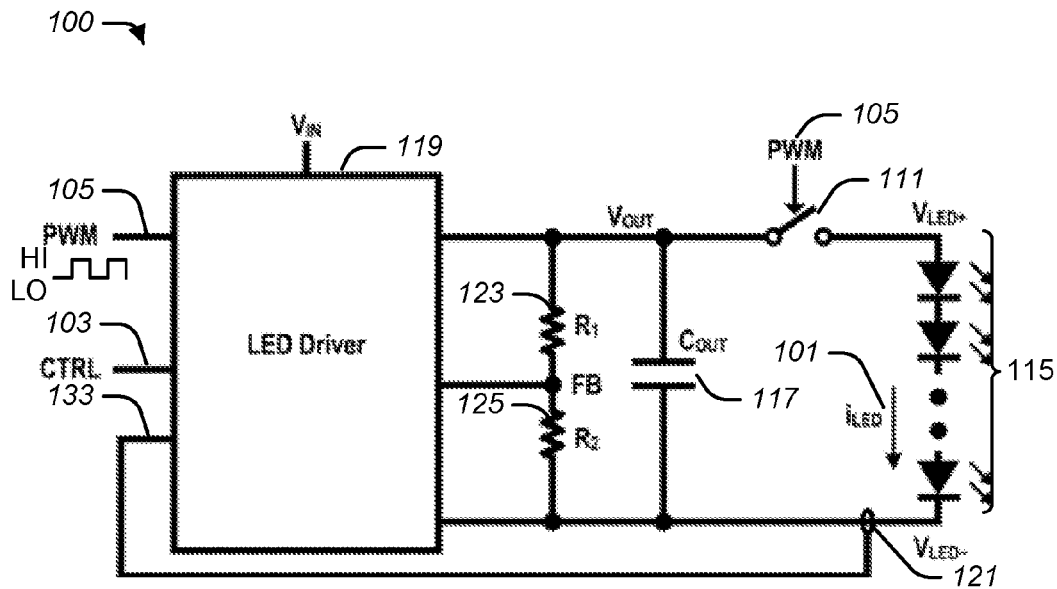
FIG. 1A illustrates an example of a prior art light emitting diode (LED) driver system.
Figure 1B:
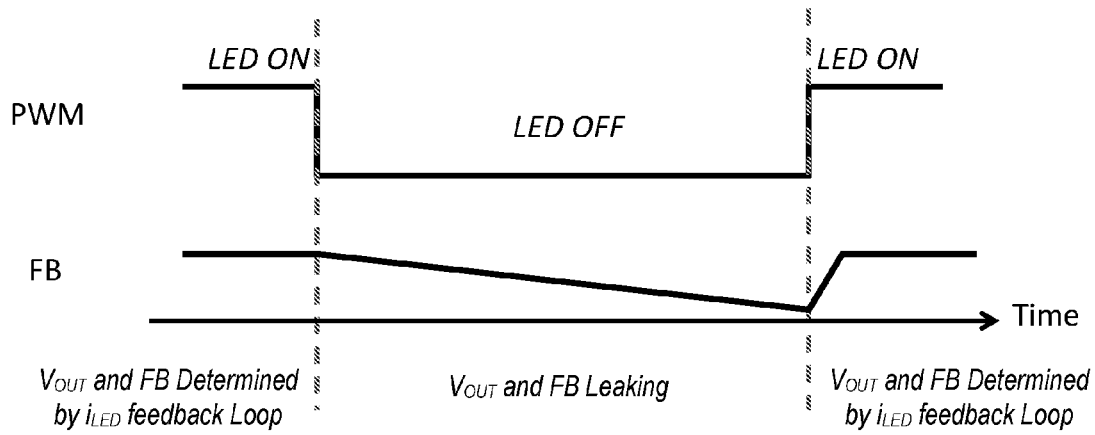
FIG. 1B illustrates example waveforms of the LED driver system of FIG. 1A.
Figure 2:
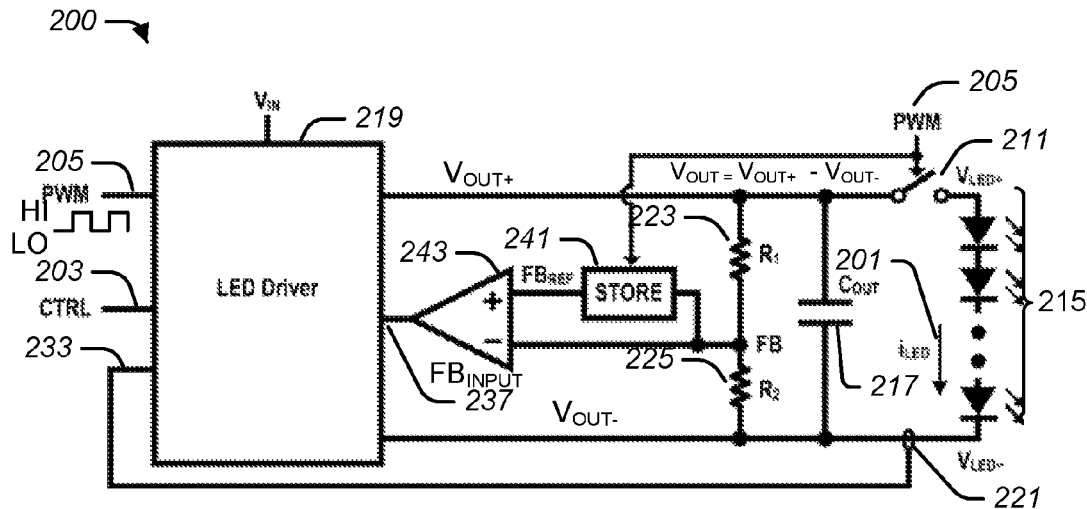
FIG. 2 illustrates an example of an LED driver system that maintains a voltage across an output capacitance element while a PWM signal is OFF, consistent with an exemplary embodiment.

FIG. 2 illustrates an example of an LED driver system 200 that maintains a voltage across an output capacitance element 217 while a PWM signal is OFF, consistent with an exemplary embodiment. The LED driver system 200 includes an LED driver 219 having a first input node 205 operative to receive a PWM signal, a second input 203 operative to receive a control signal CTRL, and a third input operative to receive an LED current sense information signal. There is an input $V_{IN}$ configured to receive power (e.g., a supply voltage) to operate the LED driver 219. In addition, the driver 219 includes an input $FB_{INPUT}$ 237 configured to receive a scaled output feedback signal. The LED driver 219 has a differential output including a first output (e.g., $V_{OUT}+$) and a second output (e.g., $V_{OUT}-$), sometimes collectively referred to herein as $V_{OUT}$. There is an output capacitance element 217 coupled between the first and second outputs of the LED driver 219. The output capacitance element 217 is configured to smooth out the signal across the LED load 215. For example, the output capacitance element 217 may filter high frequency AC currents and voltages and reduce the current ripple through the LED load 215, thereby increasing operational lifetime of the LED load 215 when the PWM is ON. It may also help maintain the output voltage of the LED driver 219 when the PWM is OFF.

The LED driver system 200 includes a voltage divider network that may include feedback resistors R1 (223) and R2 (225) connected in series. The first node of resistor R1 (223) is connected to the first output node of the driver 219 and the second node is connected to a feedback (FB) node. The second resistor R2 (225) has a first node that is connected to the FB node and a second node that is connected to the second output node of the driver 219. The voltage divider network of R1 (223) and R2 (225) is configured to provide a scaled value of the output voltage $V_{OUT}$ to the driver 219. In one embodiment, the feedback resistors R1 and R2 are external (e.g., off chip) components.

There is an error amplifier 243 having a first input configured to receive a stored feedback reference signal $FB_{REF}$ and a second input configured to receive the feedback signal from the feedback node FB. The error amplifier 243 has an output that is coupled to the $FB_{INPUT}$ 237 input of the LED driver 219. The error amplifier 243 that is configured to compare the stored feedback reference signal $FB_{REF}$ with the feedback signal from the feedback node FB to generate an output from the difference (i.e., $FB_{REF}-FB$), to the $FB_{INPUT}$ 237 input of the driver 219.

The LED driver system 200 includes a store circuit 241 having a first input coupled to the feedback node FB and a second input coupled to the PWM node 205. The store circuit 241 is configured to store the scaled value of the voltage across the output capacitance element 217 (i.e., a voltage level at the feedback node FB) of the PWM ON durations, thereby preserving the last value of the scaled value of the voltage across the output capacitance element 217 just before the PWM signal at node 205 is turned OFF. For example, the store circuit 241 may store a voltage level at the feedback node FB at the falling edge of the PWM signal. By using the falling edge of the PWM signal, the store circuit 241 is able to store a signal that is indicative of the voltage level of the feedback node FB of the PWM ON time.

The output capacitance element 217, feedback resistors R1 (223) and R2 (225), the store circuit 241, and the error amplifier 243, operate together to form a first feedback path that is configured to provide a feedback signal to the LED driver 219.

There is a first electronic switch 211 is coupled between the first output $V_{OUT+}$ of the driver 219 and a first node of the electronic load 215. When the PWM signal 205 is OFF, the LED load 215 is disconnected by the first electronic switch 211 and the voltage that was across the output capacitance element 217 before the PWM signal at node 205 was turned OFF (e.g., captured at the falling edge of the PWM signal) is maintained by the output capacitance element 217. Thus, the electronic switch 211 is open during PWM OFF times, and closed during PWM ON times.

The LED driver system 200 includes a current sensor 221 coupled to the second output of the LED driver 219. The current sensor 221 is configured to sense a current $i_{LED}$ 201 that is flowing through the LED load 215 and to provide this LED current sense information to the third input 233 of the LED driver 219. While the current sensor is illustrated to be coupled to the second output of the LED driver 219, it will be understood that, in various embodiments, it can be placed in any suitable circuit location so as to sense the current through the LED load 215.

In one embodiment, the current $i_{LED}$ 201 sensed by the sensor 221 is provided to the third input of the LED driver 219 as an LED current sense voltage. Put differently, the current signal sensed by the current sensor 221 is converted to a voltage signal. The current sensor 221 is part of a second feedback path that is configured to provide a feedback signal to the LED driver 219, such that the LED driver 219 can provide an appropriate current to the LED load 215.

The LED load 215, which may include one or more LEDs, is coupled between the first and second outputs of the LED driver 219. While the LEDs in the system 200 are illustrated by way of example to be connected in series, it will be understood that, in various embodiments, there may be a single LED, the LEDs may be connected in parallel, or the LEDs may be connected in any suitable series/parallel combination to implement a desired output.

When the PWM signal 205 is ON (i.e., at a "HI" level), the LED driver 219 causes the output current 201 flowing through the LED load 215 to match a level of current specified by the control signal CTRL at the control input 203. To that end, the output current 201 is measured by the current sensor 221, thereby providing the LED current information to the LED driver 219. Accordingly, the LED driver 219 adjusts the current $i_{LED}$ 201 delivered to the LED load 215 such that the current adheres to the signal specified by the control signal at the control node CTRL 203, based on the LED current sense signal 233.

As mentioned previously, the output voltage $V_{OUT}$ across the output capacitance element 201 is sensed by the feedback resistors R1 (223) and R2 (225). A scaled version of the output voltage $V_{OUT}$ is provided at the feedback node FB. The error amplifier 243 compares the presently sensed voltage at the feedback node FB to a voltage at the feedback node that was stored by the store circuit 241 previously (e.g., at the falling edge of the PWM signal) as a stored feedback reference signal $FB_{REF}$, and provides its output voltage to the $FB_{INPUT}$ node of the LED driver 219. By using this voltage at its $FB_{INPUT}$ node, the LED driver 219 can provide an output voltage across its differential output $V_{OUT+}$ and $V_{OUT-}$, such that the voltage across the output capacitance element 201 is maintained during the PWM OFF durations at the same level as just before the PWM signal is turned OFF (e.g., at the falling edge of the PWM signal).

Thus, when the PWM signal is OFF (e.g., at a "LO" level), the error amplifier 243 generates an output based on the difference between a present scaled feedback voltage (FB) across the output capacitance element 217 and the feedback voltage that was stored in the store circuit 241, which now serves as a target feedback reference ($FB_{REF}$). During this phase (e.g., while the PWM signal 205 is OFF), the LED load 215 is disconnected by the electronic switch 211 and the voltage across the output capacitance element 217 is maintained by the LED driver 219 based on the $FB_{INPUT}$ 237 signal.

Thus, the LED driver 219 may function to both regulate the output current 201 to the LED load 215 when the PWM signal 205 is ON, such that the current 201 is equal to the amount specified by the control signal CTRL at the control input 203, and to maintain the output voltage across the output capacitance element 217 while the PWM signal is OFF.

By virtue of the first feedback path having a store circuit that remembers a previous state of the feedback voltage FB, the output capacitance element 217 is not subject to voltage decay over long periods of time (e.g., over 1 sec.) and is therefore at the desired output voltage $V_{OUT}$ each time when the PWM signal 205 is turned back ON. Thus, an appropriate current $i_{LED}$ 201 and voltage $V_{LED+}$ and $V_{LED-}$ is provided across the LED load 215 when the PWM signal is ON, without a recovery delay. Accordingly, the LED driver system 200 is configured to quickly return to or maintain the desired current and voltage across the LED load 215, each time the PWM signal is turned back ON, even after long PWM OFF periods.

In various embodiments, the output voltage across the LED load 215 (e.g., potential difference between $V_{LED+}$ and $V_{LED-}$) may be greater or smaller than the supply voltage $V_{IN}$. For example, when the output voltage across the LED load 115 is not greater than the supply voltage $V_{IN}$, then a linear regulator may be used instead of the LED driver 219 with the error amplifier 243 to hold the voltage across the output capacitance 217 during OFF periods of the PWM signal.

Figure 3:
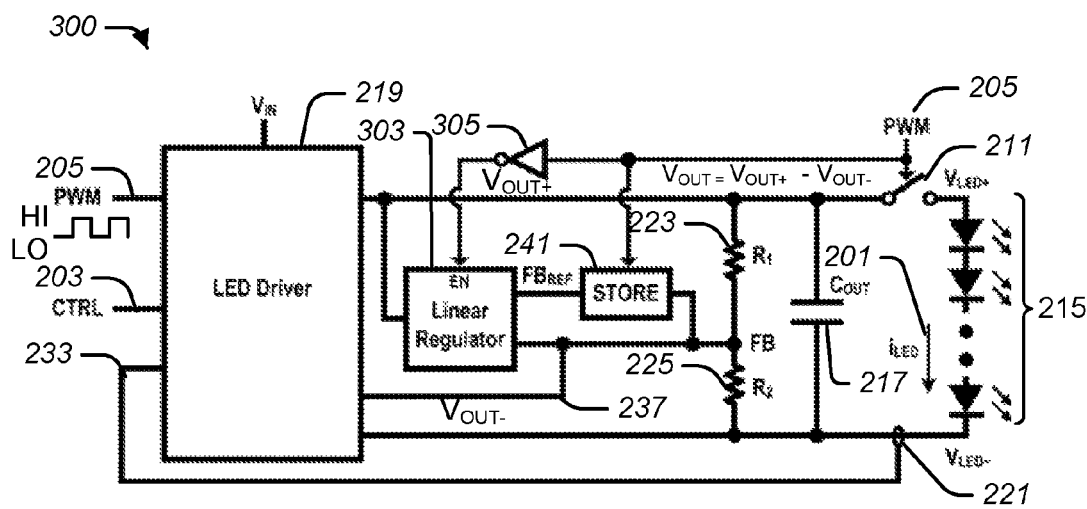
FIG. 3 illustrates an example of an LED driver system that maintains a voltage across an output capacitance element while a PWM signal is OFF by using a linear regulator.

In this regard, FIG. 3 illustrates an example of an LED driver system 300 that maintains a voltage across an output capacitance element 217 while a PWM signal is OFF by using a separate linear regulator 303. In various embodiments, the linear regulator may be active high or active low. For an active high regulator, there may be an additional inverter 305 coupled between the PWM node 205 and the enable node EN of the linear regulator 303. Put differently, the linear regulator 303 is OFF when the PWM signal is ON, and it is ON when the PWM signal is OFF. Many of the components and the functions of the LED driver system 300 of FIG. 3 are similar to those of the components and functions of the LED driver system 200 of FIG. 2, and are therefore not discussed in detail for brevity. Accordingly, the discussion below highlights some distinguishing features.

The LED driver system 300 includes an LED driver 219 having an input $FB_{INPUT}$ 237 that is configured to receive a feedback signal from the feedback node FB that represents a scaled output voltage $V_{OUT}$. In one embodiment, the LED driver 219 does not need to regulate the voltage across the output capacitance element 217 to a level just before the PWM signal is turned OFF. That is because the linear regulator 303 performs this function.

The linear regulator 303 of FIG. 3 includes a first input that is configured to receive the $FB_{REF}$ signal from the output of the store circuit 241, a second input that is coupled to the feedback node FB, and an output coupled to the first output terminal ($V_{OUT+}$) of the LED driver 219.

For example, when the PWM is OFF, the linear regulator 303 receives an error signal equal to the difference between the desired feedback reference voltage ($FB_{REF}$) that was stored in the store circuit 241 just after the PWM signal is turned OFF (e.g., at the falling edge of the PWM signal) and the scaled version of the voltage (FB) that is presently sensed across the output capacitance element 217. The linear regulator 303 may then adjust the voltage across output capacitance element 217 until the scaled version of that voltage at node FB equals the reference value ($FB_{REF}$) stored in the store circuit 241. Accordingly, in this embodiment, the LED driver 219 need not regulate the voltage across the output capacitance element 217 during OFF times of the PWM signal. Rather, this function is managed by the linear regulator 303. The output capacitance element 217, feedback resistors R1 (223) and R2 (225), the store circuit 241, and the linear regulator 303, operate together to form a first feedback path that is configured to regulate the voltage across the output capacitance element 217 when the PWM is OFF.

By virtue of the first feedback path having a store circuit that remembers a previous state and a linear regulator 303, the output capacitance element 217 is not subject to voltage decay over long periods of time (e.g., over 1 sec.) and is therefore at the desired output voltage $V_{OUT}$ each time the PWM signal 205 is turned back ON. Thus, an appropriate current $i_{LED}$ 201 and voltage $V_{LED+}$ and $V_{LED-}$ is provided across the LED load 215 when the PWM signal is ON, without a recovery delay. Accordingly, the LED driver system 300 is configured to quickly return to or maintain the desired current and voltage across the LED load 215, each time the PWM signal is turned back ON, even after long PWM OFF periods.

Example Store Circuits

In various embodiments, the store circuit 241 may be a digital circuit, an analog circuit, or a combination thereof.

Figure 4A:
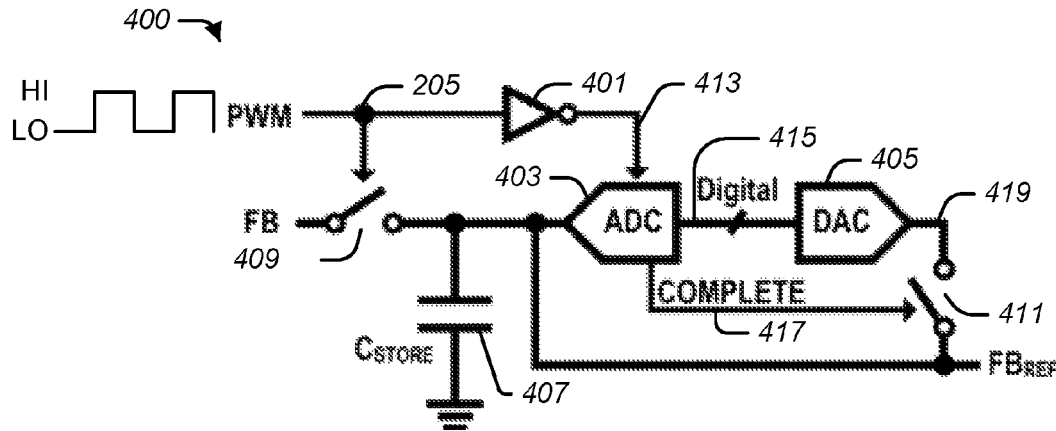
FIG. 4A illustrates an example of a digital storage circuit that may be used to implement the store circuits of FIGS. 2 and 3.

FIG. 4A illustrates an example circuit that maintains the voltage information of the feedback node FB in a digital code, which may be used to implement the store circuit 241 of FIGS. 2 and 3. As illustrated in FIG. 4A, the digital store circuit 400 may include an analog to digital converter (ADC) 403, a digital to analog converter (DAC) 405, a first electronic switch 409, a second electronic switch 411, and a storage capacitance element 407. In various embodiments, ADC 403 may be active low or active high. For example, for an active high ADC 403, there may be an additional inverter 401 coupled between the PWM node 205 and the ADC 403.

In the example of FIG. 4A, the ADC 403 has a first input coupled to the feedback node FB via a first electronic switch 409, a second input coupled to the PWM signal node 205 (which may be via an inverter 401), and a first output 415 coupled to the input of the DAC 405. In one embodiment, the ADC 403 has a separate output node 417 operative to indicate that the analog to digital conversion of the feedback signal is complete.

The DAC 405 has an input coupled to the output node 415 of the ADC 403, and an output node 419 configured to provide an analog representation of the digital signal at its input node. In one embodiment, there may be a second electronic switch 411 that is coupled between the output of the DAC 405 and the input of the ADC 403 to provide the stored feedback reference signal $FB_{REF}$. The second switch 411 has a control node that is coupled to the second output of the ADC 403 (e.g., the "COMPLETE" signal). In one embodiment, the second switch 411 is not necessary because the functionality of the second switch 411 is performed by the DAC 405 in that it has a built in switch configured to receive the output of the ADC 403 as a control signal via a second input (not shown in FIG. 4A).

In various embodiments, the DAC 405 may be operated continuously for better speed, or may be turned ON immediately at (or slightly before) the second switch 411 is turned ON, to conserve power, while providing sufficient time for the DAC 405 to convert the digital signal to an analog signal. For example, the DAC 405 may be operated continuously when there is a second switch 411 coupled to its output, or may be operated as appropriate when the functionality of the second switch is embedded within the DAC 405.

In the example of FIG. 4A, the first electronic switch 409 is configured to be ON when the PWM signal at node 205 is ON, and OFF when the PWM signal at node 205 is OFF. As to the second electronic switch 411, it is configured to be ON when the PWM signal at node 205 is OFF and the analog to digital conversion of the ADC 403 is completed. The second switch 411 may be OFF otherwise.

Accordingly, the digital storage circuit 400 in the example of FIG. 4A stores the voltage level received from the feedback node FB on the storage capacitance element 407 when the PWM signal 205 is ON. When the PWM signal at node 205 is turned OFF, the first electronic switch 409 disconnects the storage capacitance element 407 from the feedback node FB and activates the ADC 403 through the control input 413.

During this time, the ADC 403 is instructed by the PWM OFF signal to convert the voltage sensed across the storage capacitance element 407, into a digital number at its output 415. That digital number may be stored in a storage memory, which may be part of the ADC 403 or separate therefrom. In one embodiment, the digital output of the memory that is holding the voltage at the feedback node FB may be connected to an input of the DAC 405. To facilitate this discussion, it will be assumed that the memory that is holding the voltage at the feedback node FB is in the ADC 403. The DAC 405 is configured to receive the digital signal at its input node 415 and provide an analog version thereof at its output node.

Before the ADC 403 completes the conversion of the analog feedback signal to a digital representation thereof at its output 415, the voltage level at the node $FB_{REF}$ represents the stored voltage across the storage capacitance element 407. When the ADC 405 has converted and digitally stored the voltage across the storage capacitance element 407, the DAC 405 may use this digital value to drive the $FB_{REF}$ voltage. Because digitally stored values do not drift over time, the $FB_{REF}$ value driven by the DAC 405 and therefore the voltage across the output capacitance element 217 can be maintained even after a long PWM OFF period.

Thus, the value of the stored feedback reference signal $FB_{REF}$ that is delivered by the DAC 405 is substantially similar to the feedback voltage FB across the storage capacitance element $C_{STORE}$ 407 just after the PWM signal is turned OFF.

Figure 4B:
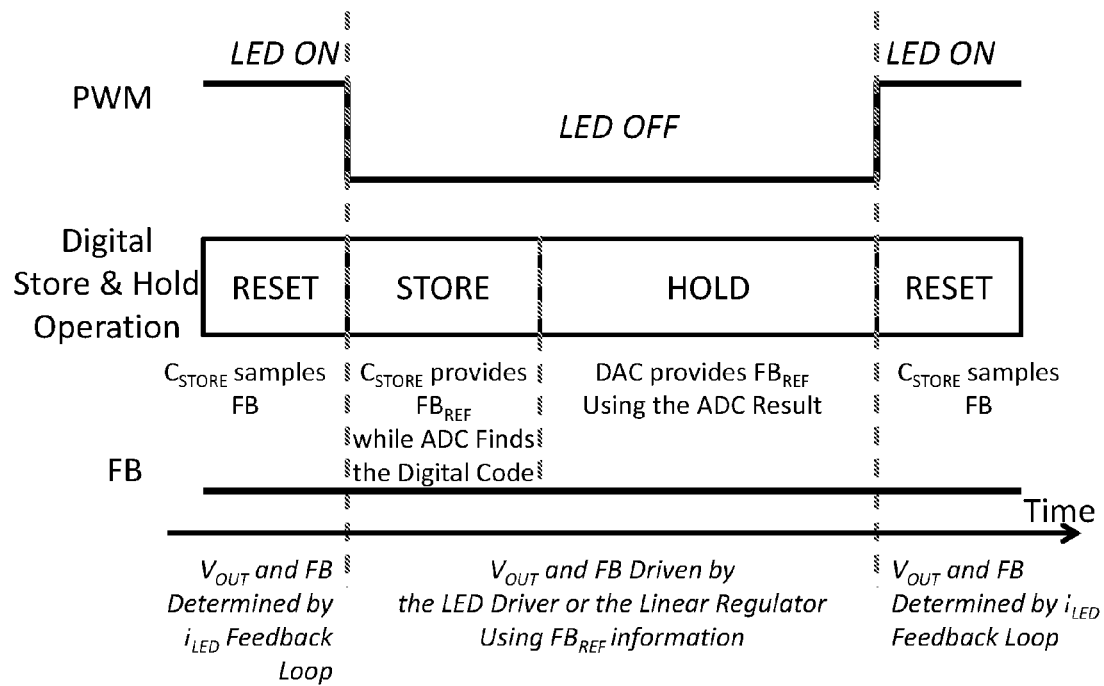
FIG. 4B illustrates example waveforms of the circuit of FIG. 4A operating in LED driver systems of FIGS. 2 and 3.

The features of FIG. 4A may be better understood in view of FIG. 4B, which illustrates example waveforms of the circuit 400 of FIG. 4A. As illustrated in FIG. 4B, the voltage at the feedback node FB is stored in a digital code after the PWM signal is OFF. In one embodiment, when the PWM is ON, the LED load is ON, while the digital store circuit 400 is reset. During this time, the voltage at the feedback node FB is determined by the second feedback path. When the PWM is OFF, the LED load is turned OFF and the digital store circuit 400 enters an initial "store" state. The duration of the store process depends on the specific implementation. During the "store" state, $FB_{REF}$ is held by $C_{STORE}$ 407. When the store process is complete, $FB_{REF}$ is held by DAC 405. Using this $FB_{REF}$ signal, the voltage level at the feedback node FB is controlled by the first feedback path throughout the whole PWM OFF time.

Different types of ADC's can be used to implement the ADC 403 of digital store circuit 400, depending on the specific requirements of the LED driver circuit. The ADCs discussed herein operate under the common principle of converting a continuous signal into a certain number of bits N. The more number of bits used, the better the precision of the ADC. Common types of ADCs include pipelined, flash, successive-approximations register (SAR), sigma delta ($\Sigma\Delta$), and integrating or dual slope.

As illustrated in FIG. 4A, a digital store circuit and/or an ADC may include one or more appropriately configured DACs to convert digital signals to the analog domain. To that end, in various embodiments, different DACs can be used, including but not limited to, pulse-width modulator, delta-sigma ($\Sigma\Delta$), binary-weighted, resistor to resistor (R-2R) ladder, successive-approximations register, thermometer-coded, and hybrid (which may use a combination of the aforementioned DACs). These DACs are operative to convert a finite number into a physical quantity in the form of a current or voltage.

As mentioned previously, in some embodiments, the store circuit discussed herein can also maintain the feedback voltage information as an analog voltage. Analog implementations may require less chip area, consume less power, and be simpler to implement. For example, several blocks, such as an ADC and a DAC, can be eliminated. Analog implementations of the store circuit may be used in various applications, including, without limitation, applications that do not require a prolonged PWM OFF time.

Figure 5A:
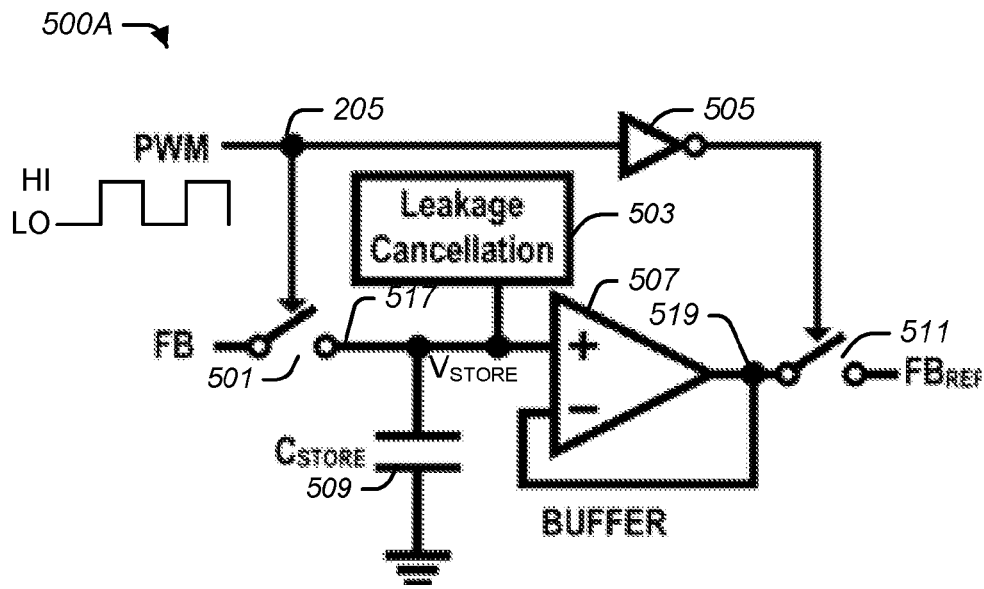
FIGS. 5A and 5B illustrate examples of analog storage circuits that may be used to implement the store circuit of FIG. 2 and or FIG. 3.
Figure 5B:
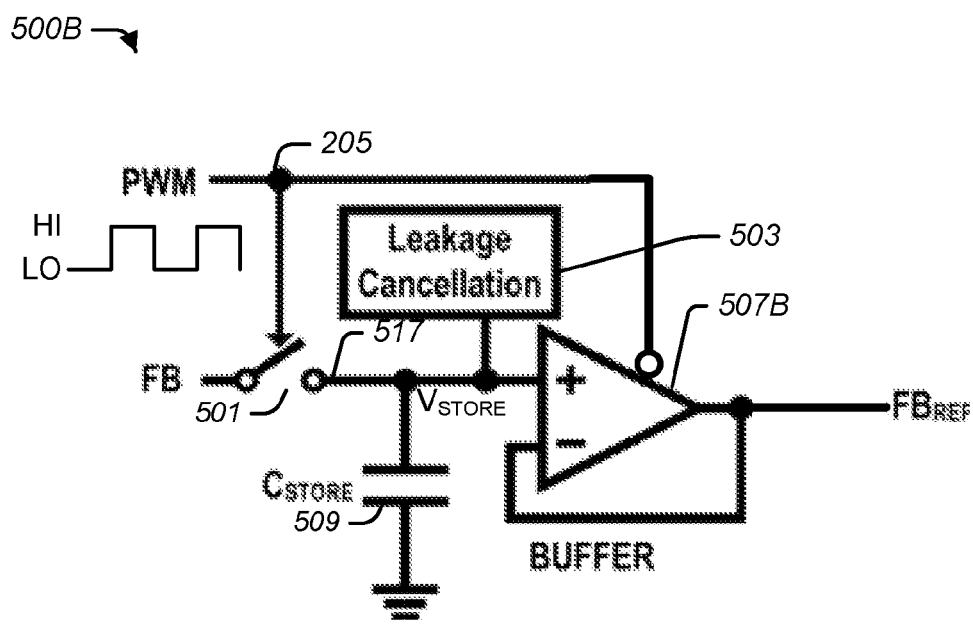

To that end, FIGS. 5A and 5B illustrate example circuits that maintain the voltage at the feedback node FB as an analog signal, which may be used to implement the store circuit 241 illustrated in FIGS. 2 and 3. As illustrated in FIG. 5A, the analog store circuit 500A includes a first switch 501, a leakage cancellation circuit 503, an amplifier (e.g., buffer) 507, and a storage capacitance element $C_{STORE}$ 509. The local storage capacitance element 509 may be integrated on the same chip, although external capacitance elements are envisioned as well. In one embodiment, the local storage capacitance element 509 is substantially smaller (e.g., a factor of 10 or more) than the output capacitance element 217.

In various embodiments, the amplifier 507 may be turned ON or OFF itself to conserve power and/or the buffer may be kept on (e.g., for speed) but coupled to a second switch 511 at the output of the amplifier 507. When a second switch 511 is used, there may be an inverter 505 coupled between the PWM input node 205 and the control node of the second switch 511. The analog store circuit 500B of FIG. 5B has substantially similar features, except that it does not have the second switch 511 and inverter 505. Instead, the amplifier 507B is controlled directly by the PWM signal at node 205 because the functionality of the switch 511 is included within the amplifier 507B.

The leakage cancellation circuit 503 is coupled to the first (e.g., positive) input 517 of the amplifier 507. The amplifier 507 may be configured as a unity gain buffer in that it has its second input (e.g., negative) coupled to its output at node 519. Accordingly, the voltage at the storage node 517 is substantially similar to the voltage at node 519 since the gain of the amplifier 507 is sufficiently high. The output of the amplifier 507 is coupled to the feedback reference node $FB_{REF}$ (e.g., via the switch 511). The first switch 501 has a first node that is coupled to the first input of the amplifier 507 and a second input that is coupled to the feedback node FB. The storage capacitor $C_{STORE}$ 509 is also coupled to the first input of the amplifier 507.

Each of the first and second switches has a control node that is coupled to the PWM node 205. The first switch 501 is configured to be in a closed state (i.e., ON) when the PWM signal 205 is ON (i.e., HI), and open (i.e., OFF) when the PWM signal 205 is OFF (i.e., LO). Conversely, the second switch 511 is configured to be OFF when the PWM signal 205 is ON, and to be ON when the PWM signal 205 is OFF. Thus, the amplifiers 507 and 507B may be deactivated when the PWM signal 205 is ON and activated when the PWM signal is OFF.

In circuits 500A and 500B, when the PWM signal at node 205 is ON, the first switch 501 closes, allowing a path from the feedback node FB to the local storage capacitance element 509. Put differently, the voltage level at the feedback node FB is stored across the local storage capacitance element 509.

When the PWM signal at node 205 is OFF, the first switch 501 opens (e.g., is OFF), thereby severing the path between the feedback node FB and the local storage capacitance element 509 at node 517. However, since there is an inverse relationship between the first switch 501 and the second switch 511, the second switch 511 is now closed (e.g., ON), thereby allowing a path between the output of the amplifier 507 and the feedback reference node $FB_{REF}$. Thus, the voltage level at the output of the amplifier 507 is provided to the first input of the error amplifier 243 (or linear regulator 303). By virtue of using the local storage capacitance element 509, which has a known capacitance, a more constant feedback reference voltage level $FB_{REF}$ can be provided to the first input of the error amplifier 243 (or the linear regulator 303).

In one embodiment, the storage circuit 500A (and 500B) have a leakage cancellation circuit 503 that is configured to further maintain the voltage stored across the local storage capacitance element 509 at node 517 when the PWM signal at node 205 is OFF. Put differently, the voltage across the local storage capacitance element 509 does not degrade over time when the PWM signal at node 205 is OFF because the leakage cancellation circuit 503 is configured to compensate for the leakage charge.

Figure 5C:
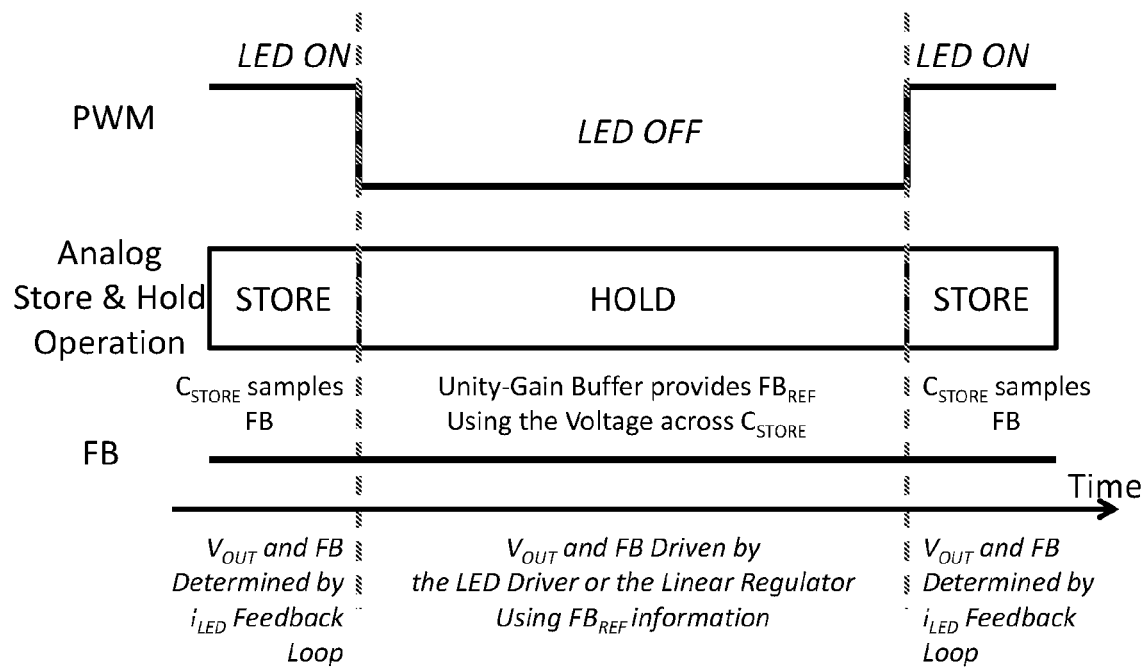
FIG. 5C illustrates example waveforms of the circuits of FIGS. 5A and 5B operating in the LED driver systems of FIGS. 2 and 3.

The features of FIGS. 5A and 5B may be better understood in view of FIG. 5C, which illustrates example waveforms of the circuits 500A and 500B of FIGS. 5A and 5B operating in the LED driver system of FIG. 2 or 3. As illustrated in FIG. 5C, the voltage at the feedback node FB can be held as an analog voltage after the PWM signal is OFF. The "store" step can be performed when the PWM signal is ON. During this time, the LED load is ON (e.g., emits light) and the voltage at the feedback node FB is determined by the second (e.g., $i_{LED}$) feedback path. When the PWM is OFF, the LED load is turned OFF and the store circuit enters a hold state, where the voltage at the feedback node FB is driven by the first feedback path that includes the store circuit 241.

CONCLUSION

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For example, any signal discussed herein may be scaled, buffered, scaled and buffered, converted to another mode (e.g., voltage, current, charge, time, etc.,), or converted to another state (e.g., from HIGH to LOW and LOW to HIGH) without materially changing the underlying control method.

In one embodiment, a charge pump may be used instead of the LED driver 219 or the linear regulator 303 discussed herein, to maintain the voltage across the output capacitance $C_{OUT}$ 217 during the PWM OFF durations.

In view of the discussion herein, the proposed techniques of maintaining the voltage across the output capacitance element 217 during inactive durations of a system to expedite the recovery can be applied to other applications that can be driven by current pulses, such as motor drivers.

Another variation of the proposed techniques may regulate the output voltage during a PWM OFF time at a different level than the one during a PWM ON time. Depending on the load impedances, the output voltage can be maintained at a higher or lower level during the PWM OFF times to generate a desired recovery response when the PWM returns to an ON state.

Unless otherwise stated, all measurements, values, ratings, positions, magnitudes, sizes, and other specifications that are set forth in this specification, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

All articles, patents, patent applications, and other publications that have been cited in this disclosure are incorporated herein by reference.

It will be understood that the terms and expressions used herein have the ordinary meaning as is accorded to such terms and expressions with respect to their corresponding respective areas of inquiry and study except where specific meanings have otherwise been set forth herein. Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A light emitting diode (LED) driver system comprising:
    a control signal input configured to receive a control signal;
    a pulse-width modulation (PWM) input configured to receive a PWM signal;
    a driver having a first input coupled to the PWM input, a second input coupled to the control signal input, a third input configured to receive an LED current sense signal, a fourth input configured to receive a first feedback signal, and a differential output, wherein the driver is configured to deliver a level of current indicated by the control signal, to a light emitting diode (LED) load when the PWM signal is ON and stop delivering the level of current when the PWM signal is OFF;
    an output capacitance element coupled across the differential output of the driver; and
    a first feedback path coupled between the differential output of the driver and the fourth input of the driver, wherein the first feedback path has a store circuit configured to:
        store an information indicative of a first voltage level across the output capacitance element as a stored feedback reference signal just after the PWM signal is turned OFF; and
        cause the voltage across the output capacitance element to be at the first voltage level just before the PWM signal is turned ON.

2. The LED driver system of claim 1, wherein the first feedback path comprises:
    a first resistance element coupled between a first terminal of the differential output of the driver and a feedback node;
    a second resistance element coupled between a second terminal of the differential output of the driver and the feedback node; and
    an amplifier having a first input configured to receive the stored feedback reference signal, a second input coupled to the feedback node, and an output coupled to the fourth input of the driver, wherein the store circuit is coupled between the first input of the amplifier and the feedback node.

3. The LED driver system of claim 2, wherein the first feedback path is configured to:
    compare the stored feedback reference signal received from the store circuit to a present voltage level at the feedback node; and
    provide the first feedback signal to the LED driver based on the comparison.

4. The LED driver system of claim 1, further comprising a second feedback circuit configured to provide a voltage representation of the current flowing through the LED load as the LED current sense signal to the second input of the driver.

5. The LED driver system of claim 4, wherein the second feedback circuit comprises a current sensor having a node coupled to a second terminal of the differential output of the driver.

6. The LED driver system of claim 1, wherein the store circuit is configured to maintain the stored feedback reference signal as a digital code.

7. The LED driver system of claim 2, wherein the store circuit comprises:
    an analog to digital converter (ADC) configured to convert a voltage signal at the feedback node to a first digital signal, the ADC comprising:
        a first input;
        a second input coupled to the PWM input;
        a first output operative to provide the first digital signal; and
        a second output;
    a digital to analog converter (DAC) configured to convert the first digital signal to a first analog signal, the DAC comprising:
        an input coupled to the first output of the ADC; and
        an output operative to provide the first analog signal;
    a storage capacitance element coupled between the first input of the ADC and a ground;
    a first switch comprising:
        a first node coupled to the feedback node;
        a second node coupled to the first input of the ADC; and
        a control node coupled to the PWM input; and
    a second switch comprising:
        a first node coupled to the output of the DAC;
        a second node operative to provide the first analog signal as the stored feedback reference signal; and
        a control node coupled to the second output of the ADC.

8. The LED driver system of claim 7, wherein the second output of the ADC turns ON when the PWM signal is turned OFF and a conversion of the voltage signal at the feedback node to the first digital signal of the ADC is complete.

9. The LED driver system of claim 1, wherein the store circuit is configured to maintain the stored feedback reference signal as an analog voltage.

10. The LED driver system of claim 9, wherein the store circuit comprises:
- a first amplifier having positive input coupled to a storage node, a negative input, and an output coupled to the negative input of the first amplifier, wherein the first amplifier is configured to provide the stored feedback reference signal when the PWM signal is OFF and store the feedback node voltage when the PWM signal is ON;
- a storage capacitance element having a first node coupled to the storage node and a second node coupled to a ground;
- a first switch coupled between the storage node and the feedback node, wherein the first switch is configured to provide a voltage level of the feedback node to the positive input of the amplifier when the PWM signal is ON.

11. The LED driver system of claim 10, further comprising a leakage cancellation circuit coupled to the storage node.

12. The LED driver system of claim 11, wherein the leakage cancellation circuit is configured to replenish a leakage current of the storage capacitor of the store circuit.

13. The LED driver system of claim 10, wherein:
- the first amplifier has a third input coupled to the PWM input; and
- the first amplifier is ON when the PWM signal is OFF, and OFF when the PWM is ON.

14. The LED driver system of claim 10, further comprising a second switch comprising:
- a first node coupled to the output of the first amplifier;
- a second node operative to provide the stored feedback reference signal; and
- a control node coupled to the PWM input.

15. The LED driver system of claim 1, wherein the first feedback path comprises:
- a first resistance element coupled between a first terminal of the differential output of the driver and a feedback node;
- a second resistance element coupled between a second terminal of the differential output of the driver and the feedback node; and
- a linear regulator having a first input configured to receive the stored feedback reference signal, a second input coupled to the feedback node, and an output coupled to the first terminal of the differential output of the driver, wherein the store circuit is coupled between the first input of the linear regulator and the feedback node.

16. The LED driver system of claim 15, wherein the linear regulator is configured to adjust the voltage across output capacitance element during a PWM OFF duration until a scaled version of the voltage across the output capacitance element at the feedback node equals the stored reference feedback signal just after the PWM signal is turned OFF.

17. The LED driver system of claim 15, wherein:
- the linear regulator includes another input that is coupled to the PWM input; and
- the linear regulator is ON when the PWM signal is OFF; and
- the linear regulator is OFF when the PWM signal is ON.

18. A method of driving a light emitting diode (LED) load with a circuit including a driver, an output capacitance element, and a first feedback path having a feedback node and a store circuit, the method comprising:
- receiving, by the driver, a PWM signal, a control signal, and an LED current sense signal;
- storing, by the store circuit of the first feedback path, a voltage level at the feedback node as a stored feedback reference signal just after the PWM signal is turned OFF, wherein the stored feedback reference signal is indicative of a first voltage level across the output capacitance element;
- comparing, by the first feedback path, the stored feedback reference signal to a present voltage level at the feedback node; and
- causing the voltage level across the output capacitance element to be at the first voltage level based on the comparison just before the PWM signal is turned ON.

19. The method of claim 18, further comprising:
- causing the driver to provide a level of current indicated by the control signal to the LED load when the PWM signal is ON; and
- preventing to deliver current to the LED load when the PWM signal is OFF.

20. The method of claim 18, further comprising:
- converting the voltage level at the feedback node to a first digital signal;
- storing the first digital signal at the falling edge of the PWM signal;
- converting the first digital signal into an analog signal; and
- providing the analog signal as the stored feedback reference signal after the PWM signal is OFF.

* * * * *